Nov. 13, 1956            A. A. FOKIAS            2,770,094
MULTIPLE EXPANSION RECIPROCATING STEAM ENGINE WITH
TURBINE OPERATING FROM INTERMEDIATE STAGE
Filed Oct. 6, 1952            6 Sheets—Sheet 1

INVENTOR
ANGELIS A. FOKIAS

BY Sol Shappurio

ATTORNEY

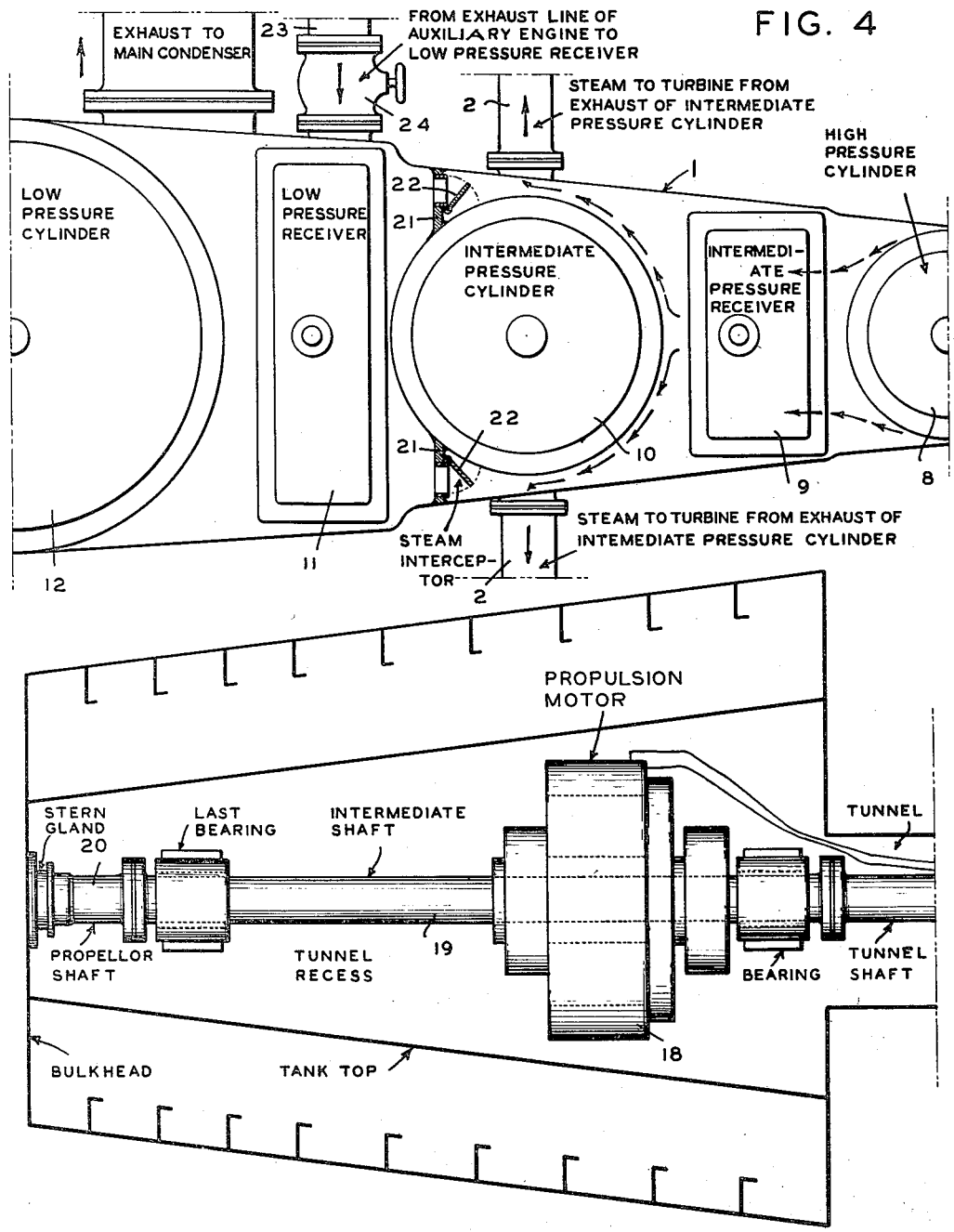

INVENTOR
ANGELIS A. FOKIAS

BY  Sol Shappirio

ATTORNEY

United States Patent Office 2,770,094
Patented Nov. 13, 1956

2,770,094

MULTIPLE EXPANSION RECIPROCATING STEAM ENGINE WITH TURBINE OPERATING FROM INTERMEDIATE STAGE

Angelis A. Fokias, Washington, D. C.

Application October 6, 1952, Serial No. 313,309

2 Claims. (Cl. 60—21)

This invention relates to power installations particularly of the type used in connection with ships or similar marine power installations wherein steam or other elastic fluid is employed in a multiple expansion reciprocating steam engine to give increased economy of operation and other advantages.

In the prior art various systems have been devised for utilizing exhaust steam from the final expansion stage of a multiple expansion reciprocating steam engine or similar structure, such systems utilizing such exhaust steam from the final expansion stage to operate turbines as in turbo-generators or for analogous purposes. Such systems however while of some value do not take full advantage of the possibilities and do not obtain the highest efficiencies possible.

Among the objects of the present invention is included marine power installations employing multiple expansion reciprocating steam engines where maximum efficiency is obtained in the utilization of the available heat.

Further objects include the production of power with less consumption of fuel than was heretofore possible or with the same consumption in fuel as in prior systems to develop increased power.

Further objects include provisions for propulsion of the ship in the event that the main engine ceases to function.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

Figure 1:
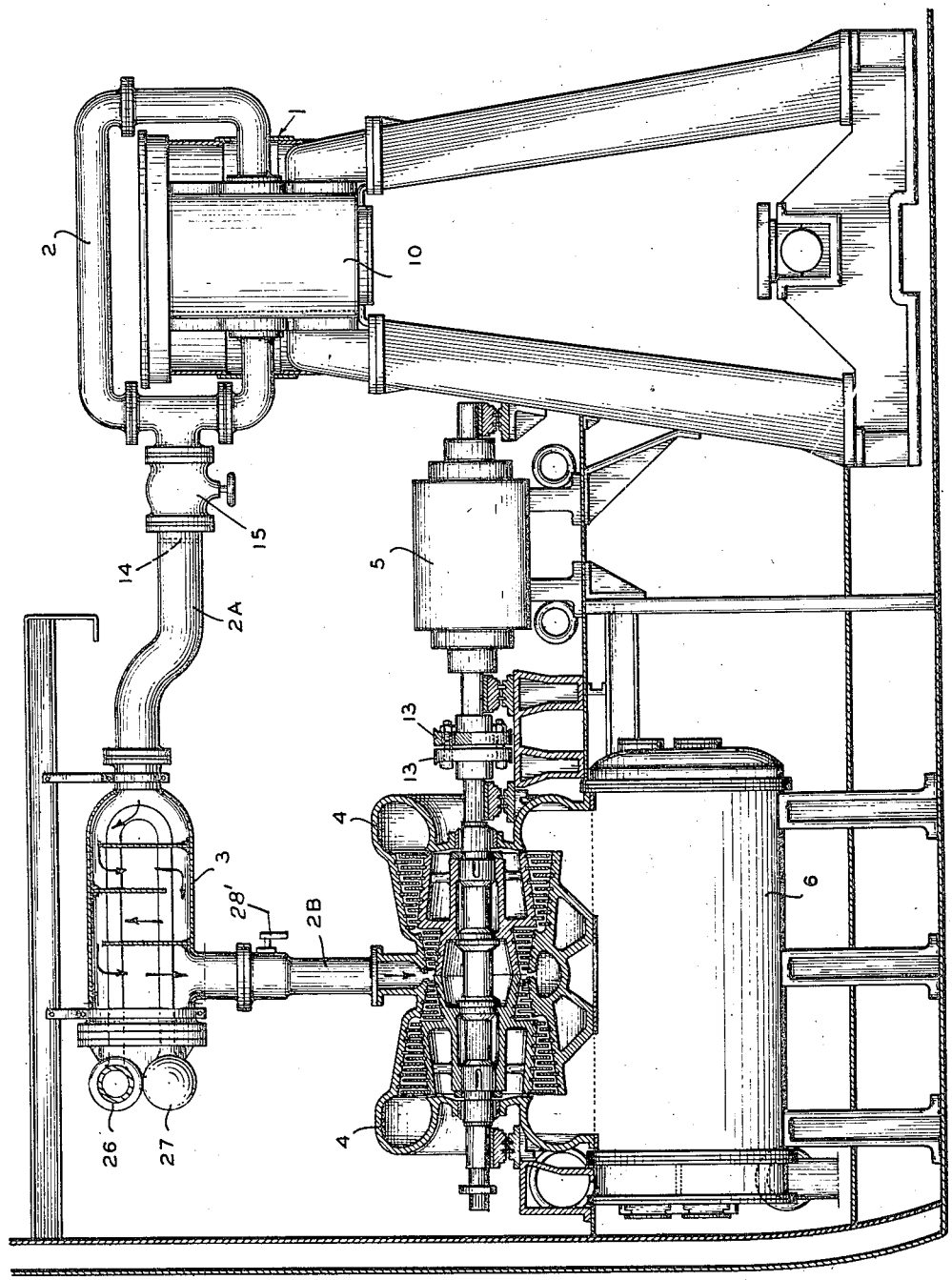
Figure 2:
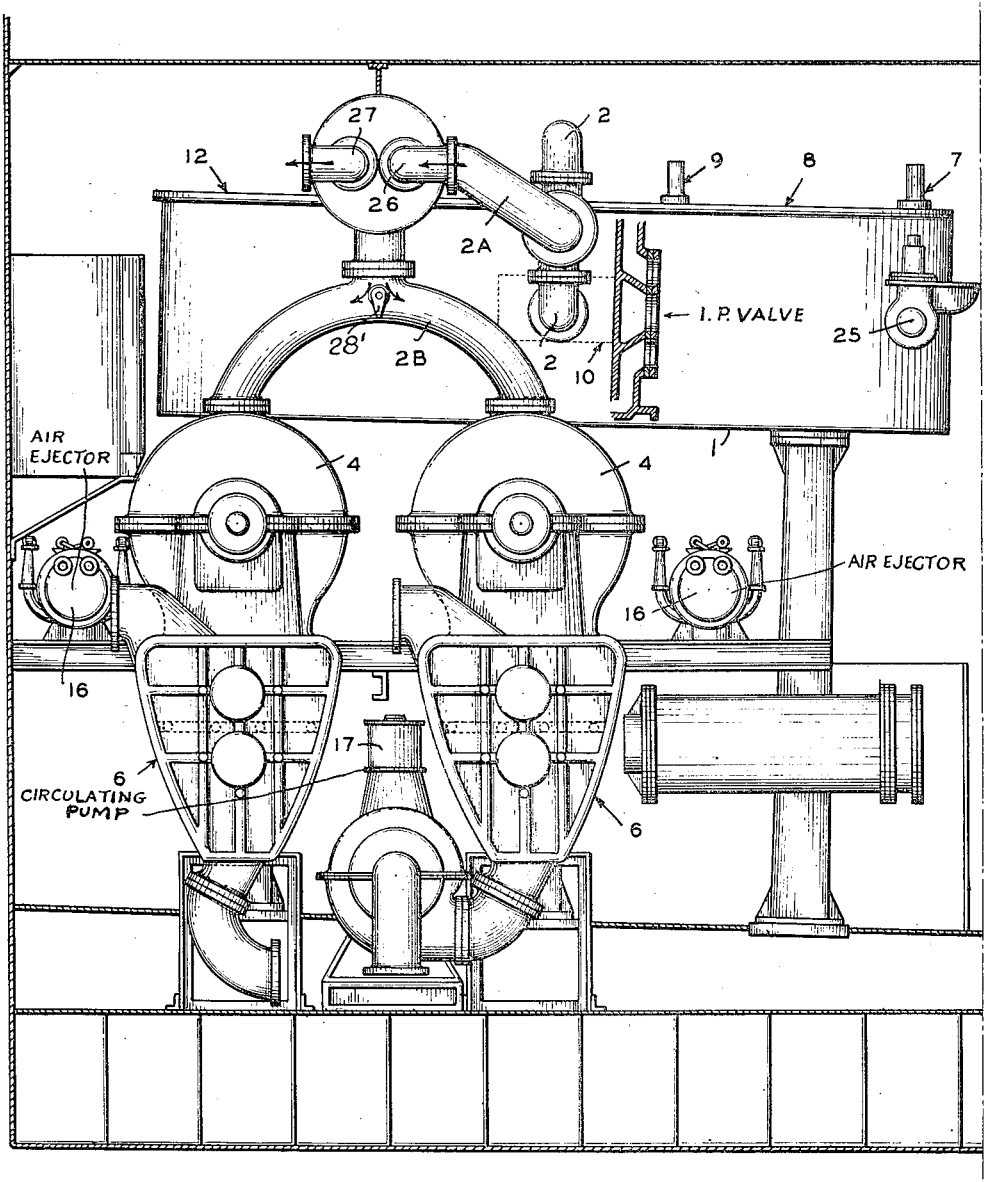
Figure 3:
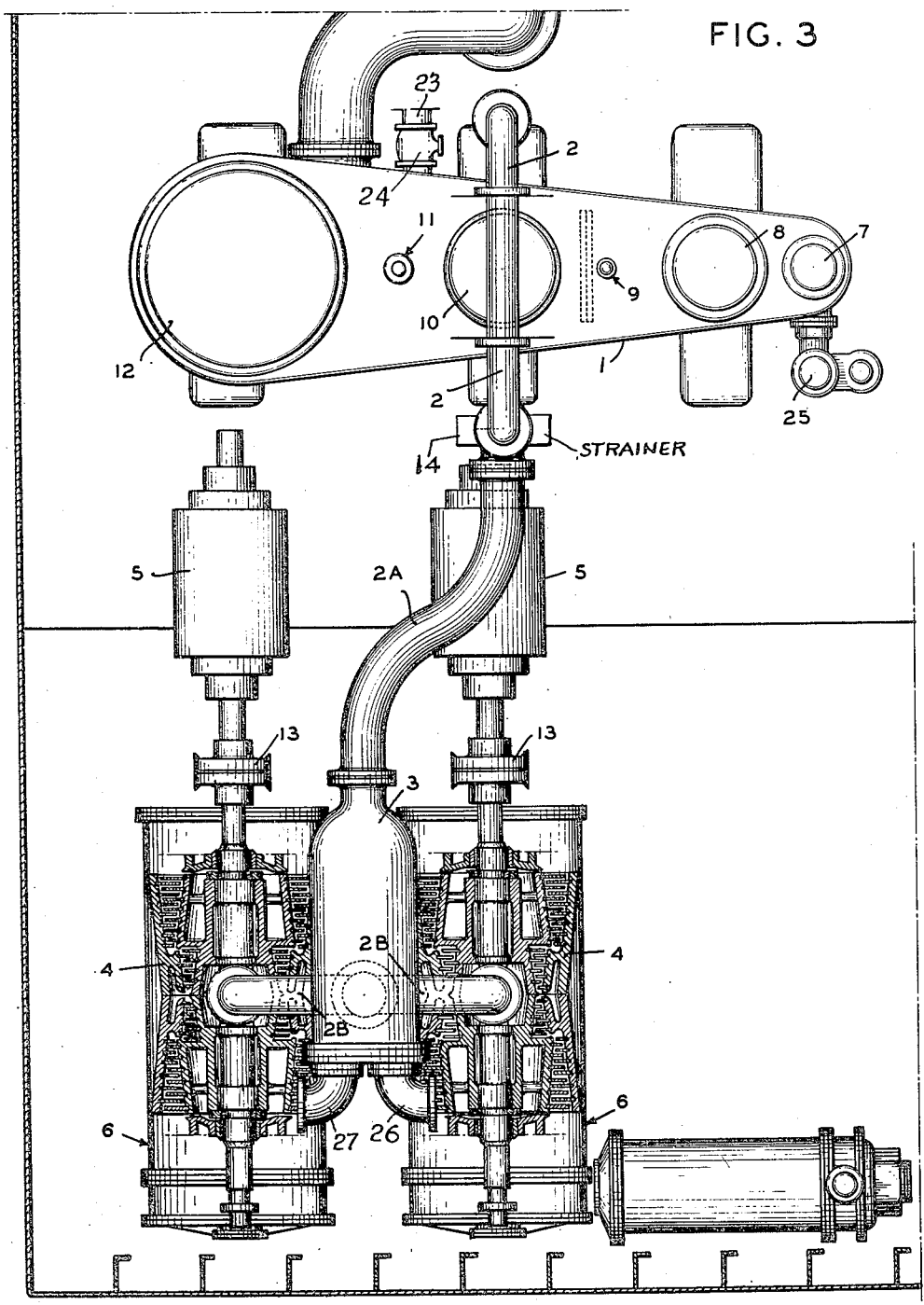
Figure 6:
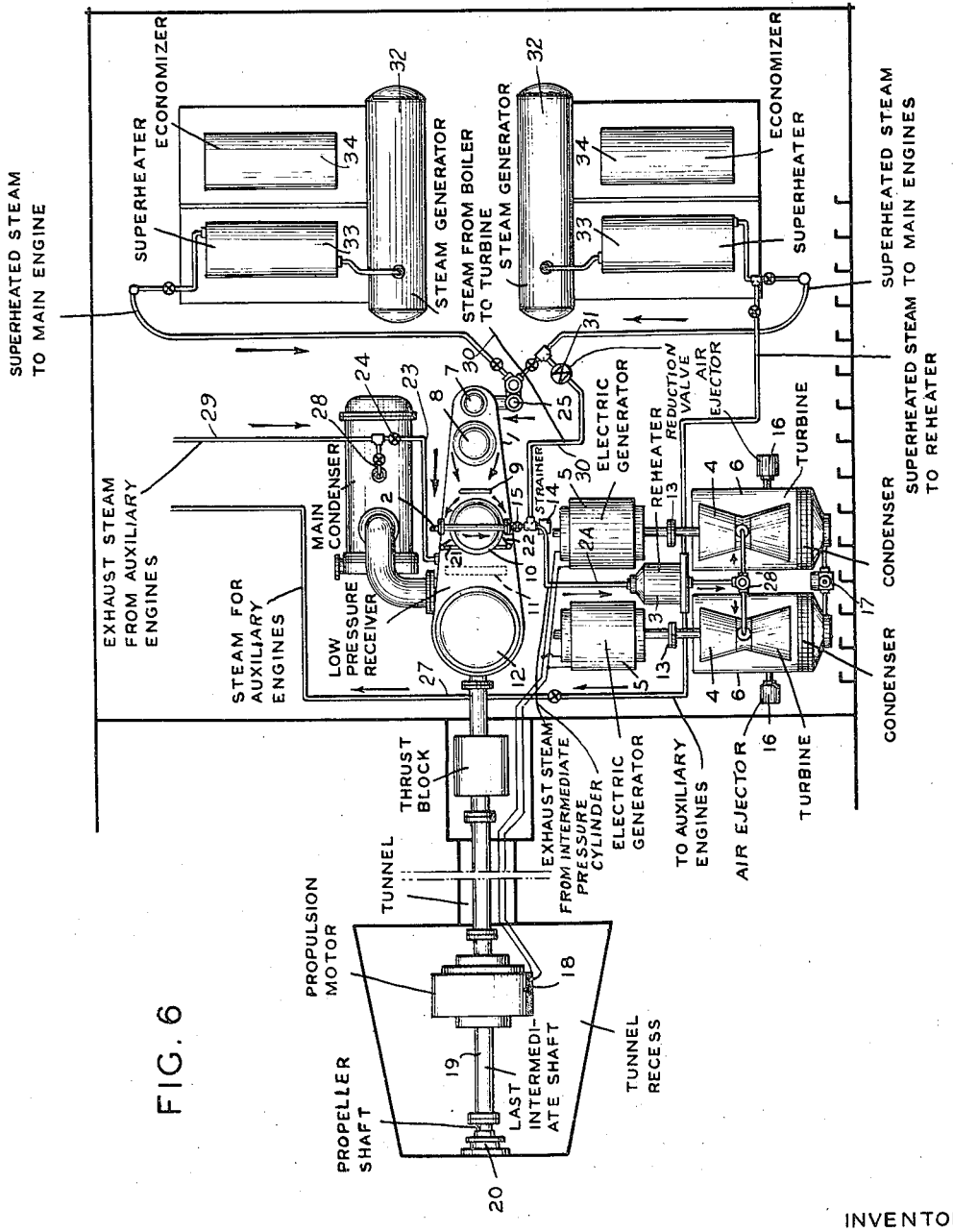
Figure 7:
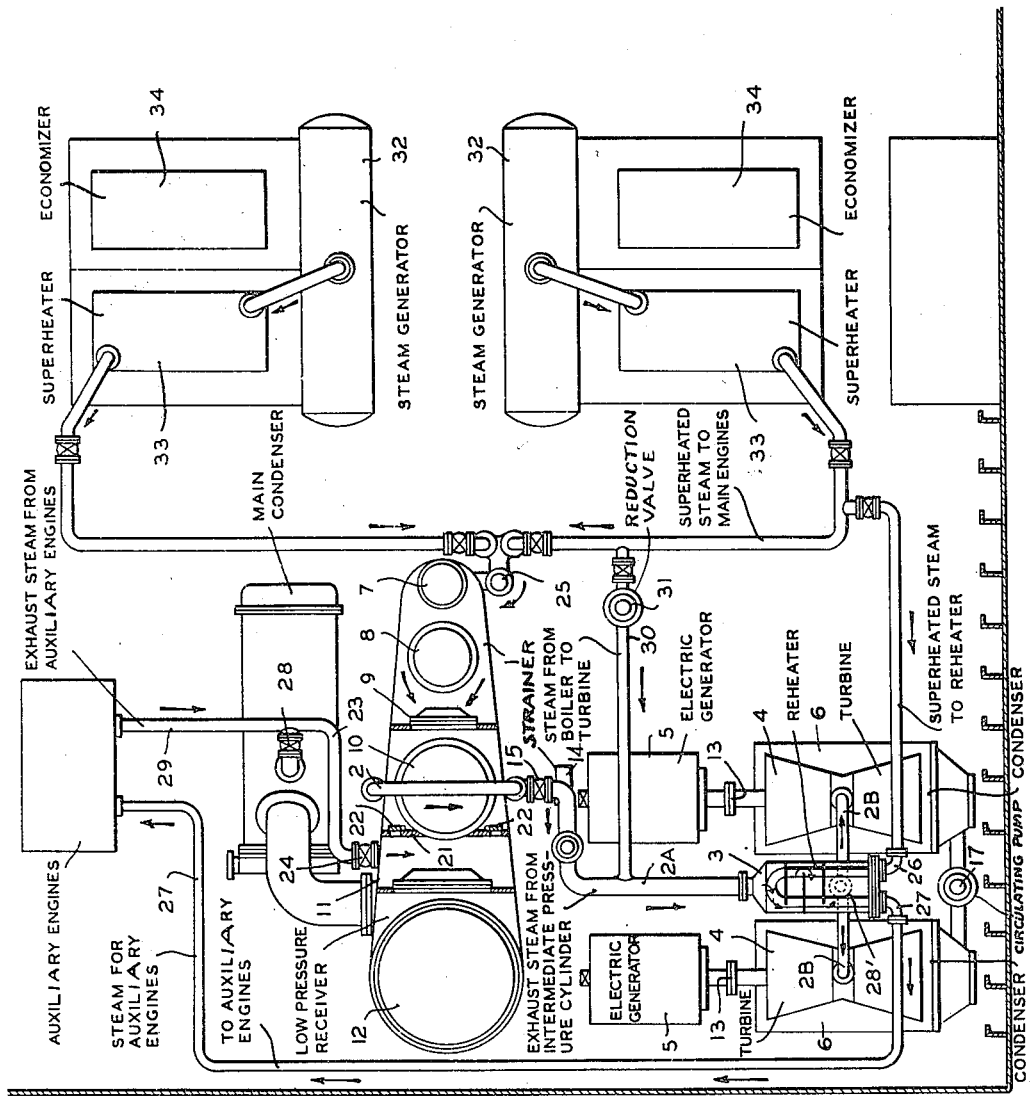

In connection with that more detailed description there is shown in the accompanying drawings in Figure 1 a vertical side elevation, partly in section, showing an installation in accordance with the present invention; in Figure 2, a front elevation of the structure of Figure 1; in Figure 3, a top plan view of said installation; in Figure 4, a top plan view partly in sections of a portion of the installation; in Figure 5, a top plan view of the tunnel and shafting, in Figure 6, a general plan view of the installation; and Figure 7 is a schematic representation of the flow of fluid in the system.

In accordance with the present invention it has been found that in elastic fluid marine power installations utilizing multiple expansion reciprocating steam engines having at least three stages of expansion, that great economies in power development can be obtained by utilizing the exhaust steam from an intermediate expansion stage of said engine to drive a turbine as in a turbo-generator combination. Any multiple expansion reciprocating steam engine having at least three stages of expansion can be utilized such as engines of this type having three or four stages of expansion. A three stage expansion type engine will be utilized to explain the invention without however limiting it in that connection. For the greatest economies in development of power with less consumption of fuel or in the development of greater power with the same consumption of fuel as heretofore experienced, it is desirable to use two steam turbines receiving steam from the exhaust of and intermediate expansion stage of the engine such as the intermediate pressure stage of a three stage expansion steam engine and to provide an electric generator to be driven by each of said turbines with the usual accessory parts employed in that connection.

Under such circumstances the present invention provides great economy in the production of power by less consumption to an extent of about a double (economy) in comparison with the prior art practice. In the system referred to above particularly where two turbo-generators are employed there is desirably utilized two condensers one for receiving the exhaust steam from each of said turbines and also a reheater wherein the exhaust steam from the intermediate expansion stage is reheated to deliver reheated steam to the turbines. For further economies an economizer is utilized wherein feed water is heated by utilization of outlet gases from a steam generator. In this arrangement it becomes possible to insure propulsion of the ship in the event that the main engine should cease functioning by supplying live steam to the turbines and running independently from power developed from the turbines and transmitted to the power shaft by means of the propulsion motor and the usual propeller shaft. Safety of the ship and the crew is thus assured under such conditions. The condensers used in connection with reception of the exhaust steam from each of said turbines are to be distinguished from the main condenser generally employed in marine power installations, since for present purposes separate condensers are used for receiving the exhaust steam from each of the turbines.

To illustrate the invention the drawings utilize a marine steam power installation of the character found on Liberty ships, the installation including a triple expansion three cylinder reciprocating steam engine of the usual type. This type of installation will be utilized to explain the invention without limitation since as pointed out above any multiple expansion reciprocating steam engine having at least three stages of expansion may be employed. The drawing as in Figure 6 shows a triple expansion three cylinder reciprocating steam engine 1, steam from the usual steam generator or boiler 32 passing through the usual superheater 33 used in conjunction therewith and through the high pressure piston valve 7 to the high pressure cylinder 8 from which after performing work in said cylinder 8, the steam passes into the receiver 9 of the intermediate pressure stage, then through the slide valve I. P. (see Fig. 2) from which it passes into the intermediate pressure cylinder 10. The steam passage 2 includes a strainer 14 for cleaning the steam before admission through the reheater (passage 2A) to the turbines. The reheated steam from the reheater 3 passes through steam passages 2B and is conveyed into the turbines 4, the steam through valve 28' being divided into two streams where two turbines 4 are used as in the more desirable form of the invention. From the turbines 4 the exhausted steam passes into condensers 6 there being one such condenser desirably for each of the turbines.

The exhaust steam from the intermediate pressure cylinder 10 instead of following the usual path employed in the prior art of passing to the low pressure receiver 11 is diverted by the wall or partition 21 (Figure 4) into the passage 2 described above by which it ultimately reaches the turbines 4.

In the reheater 3 the steam from the exhaust of the intermediate pressure cylinder 10 is reheated by any desirable means. For this purpose superheated steam may be supplied directly from the superheater 33 of the steam generators 32 as conventionally used and such superheated steam passed into the reheater 3 through the inlet 26 into a heating coil through which such steam after reheating the exhaust steam from the intermediate pressure cylinder 10 passes through outlet 27 to auxiliary engines such steam thus being used for driving the auxiliary engines. Reheating the exhaust steam from the intermediate pressure cylinder 10 in the reheater 3 before admission to the turbines 4 dries such exhaust steam and raises the temperature considerably thereby increasing substantially the whole mechanical efficiency of the power installation. It may be pointed out in this connection that the exhaust steam from the intermediate pressure cylinder 10 may enter the reheater at a temperature of about 255° F. and through heat exchange with superheated steam the temperature of the exhaust steam is raised to a temperature of about 350 to 450° F. before being passed to the turbines 4. The superheated steam used for these purposes for reheating the stated exhaust steam from the intermediate pressure cylinder 10, may enter the heating coil in the reheater at a temperature of about 450 to 650° F. and leaves such coil at a temperature of about 390 to 500° F. to pass through line 27 to the auxiliary engines as explained above.

The turbines 4 are connected by means of couplings 13 with the shafts of electric generators 5 the latter thus having the same speed of rotation as the turbines 4 and the combination hereafter being called turbo-generators. In this arrangement it becomes possible to utilize a reduction gear, in lieu of the referred flexible coupling 13, in order to connect the turbines 4 with the electric generators 5, thus the speed of rotation of said electric generator becomes less than the speed of rotation of said turbines. Lubrication of the turbo-generators may be provided in conventional way by an oil pumping combination with a water cooler.

The power produced by the turbo-generators may be used by transmission lines (not shown) to propulsion motor 18 (Figures 5 and 6) located in the tunnel recess and attached to the last intermediate tunnel shaft 19, the propeller shaft 20 being connected to the shaft 19.

Since the steam from the exhaust of the intermediate pressure stage is utilized as explained above for operation of the turbo-generators, steam must be supplied for the low pressure receiver 11 from a different source and for purposes of the present invention such steam is obtained from the exhaust line 29 (Figure 6) of the auxiliary engine or engines by means of the steam passage 23 (Figures 4 and 6) by means of which the exhaust line 29 of the auxiliary engines is connected with the low pressure receiver 11. Any arrangement for this purpose can be used if necessary an opening being provided in the casing for this purpose. Further, since the exhaust steam from the auxiliary engines is utilized as explained above in the low pressure stage, in order to supply heat in the feed heater for heating the feed water, an economizer 34 is located on top of the superheater 33 attached to the steam generators 32 in the conventional way and actually the feed water may be heated in this way more efficiently than by the old type feed heaters of the prior art. For this purpose the economizer 34 may utilize the outlet gases of the steam generators 32 employing the thermal energy of said gases for heating the feed water without expenditure of fuel and thereby substantially increasing the overall efficiency of the power installation.

It is desirable to maintain a substantially high vacuum in the separate condensers 6 employed with the turbines 4 and for this purpose any means for maintaining such vacuum in the condensers may be employed. As illustrated a pair of air-ejectors 16 may be utilized; one air-ejector 16 being used in connection with each condenser 6. The air-injectors may be of the so-called two stage inter- and after-condenser type. For pumping the condensation water from the condensers 6 any means may be employed such as an independently driven condensate pump. To circulate water to the said condenser 6 a centrifugal circulating pump 17 may be employed of course of size sufficient for these purposes.

A steam passage 30 may be provided to supply live steam direct from the steam generators 32 (Figure 6) through a reduction valve 31 (Figure 6) to the turbines 4 in order to keep said turbines running in the event that the main engine ceases to function for any reason such as broken parts.

For disconnection of the turbines 4 so that the main engine may run independently as when the ship is in port, this may be effected by means of steam valve 15 located between the intermediate pressure cylinder 10 and the steam strainer 14, by closing the steam to the turbines and simultaneously opening the two steam valves 22 located in the steam tight divisions or wall or partition 21 (Figure 4) in the walls of the intermediate pressure cylinder. In this way the exhaust steam from the intermediate pressure cylinder 10 is conveyed to the low pressure receiver 11 and in that connection the valve 24 is simultaneously closed on the low pressure casing to the steam passage 23, and simultaneously opening the valve 28 (Figure 6) located on the top of the main condenser in conjunction with the exhaust line 29 (Figure 6) of the auxiliary engine so that the exhaust steam from the auxiliary engine or engines is conveyed directly to the main condenser.

Principal advantages of the present invention include first, the utilization of the exhaust steam from the intermediate pressure cylinder of the main engine to operate turbines; second, the utilization of a reheater in order to reheat the steam before its admission into the turbine; third, the utilization of separate condensers for said turbines especially as explained above whereby the whole mechanical efficiency of the power installation is increased substantially while the thermal energy absorbed from the vacuum is transformed by the action of the turbines into kinetic energy; fourth, the utilization of an independent steam passage directly from the steam generators to supply live steam through a reduction valve to the turbines 4 in order to operate said turbines in the event that the main engine fails for any reason so that with this arrangement it is possible to keep the turbo-generators operating independently whereby the power developed by said turbo-generators may be transmitted to the propulsion motor through the intermediate tunnel shaft and the propeller shaft. Even though the speed of the ship may be reduced, it will be able to continue its voyage and maintain the safety of the ship and the crew; and fifth, the equipment referred to above may be readily installed in the engine room in such ships as those indicated above and no structural alteration is necessary. In addition to the economies referred to above it is possible for the cargo vessels to carry a great deal more cargo with important economies in view of the economical consumption of fuel as described above.

Having thus set forth my invention, I claim:

1. In an elastic fluid marine power installation, in combination, a supply of live steam and a multiple expansion reciprocating steam engine comprising at least three stages of expansion, turbine means connected to an intermediate expansion stage of said engine for receiving steam from the exhaust of said intermediate stage, a reheater having separate flow passages, the first connected to said supply of live steam and the second connecting the intermediate expansion stage and the turbine means to receive the exhaust steam from said intermediate said expansion stage, an auxiliary engine connected to said reheater for receiving steam from said first passage after said steam has reheated the exhaust steam from the intermediate expansion stage, a partition fitted with valve means placed between the exhaust of the intermediate stage of expansion and the low pressure stage of expansion whereby, by closing the valves, the steam is diverted from said low pressure stage to said turbine means, a steam passage between said auxiliary engine and the low pressure stage of expansion engine to convey exhaust steam to the reciprocating engine.

2. A marine power installation as claimed in claim 1 wherein said turbine means comprises a pair of steam turbines.

References Cited in the file of this patent

UNITED STATES PATENTS

| | | |
|---|---|---|
| 1,723,302 | Ruths | Aug. 6, 1929 |
| 1,865,909 | Hinchcliffe et al. | July 5, 1932 |
| 1,930,064 | Schmidt | Oct. 10, 1933 |
| 1,933,324 | Freiburghouse | Oct. 31, 1933 |
| 1,967,755 | Junkins | July 24, 1934 |

FOREIGN PATENTS

| | | |
|---|---|---|
| 367,626 | Great Britain | Feb. 25, 1932 |
| 395,107 | Great Britain | July 13, 1933 |